Patented Oct. 27, 1931

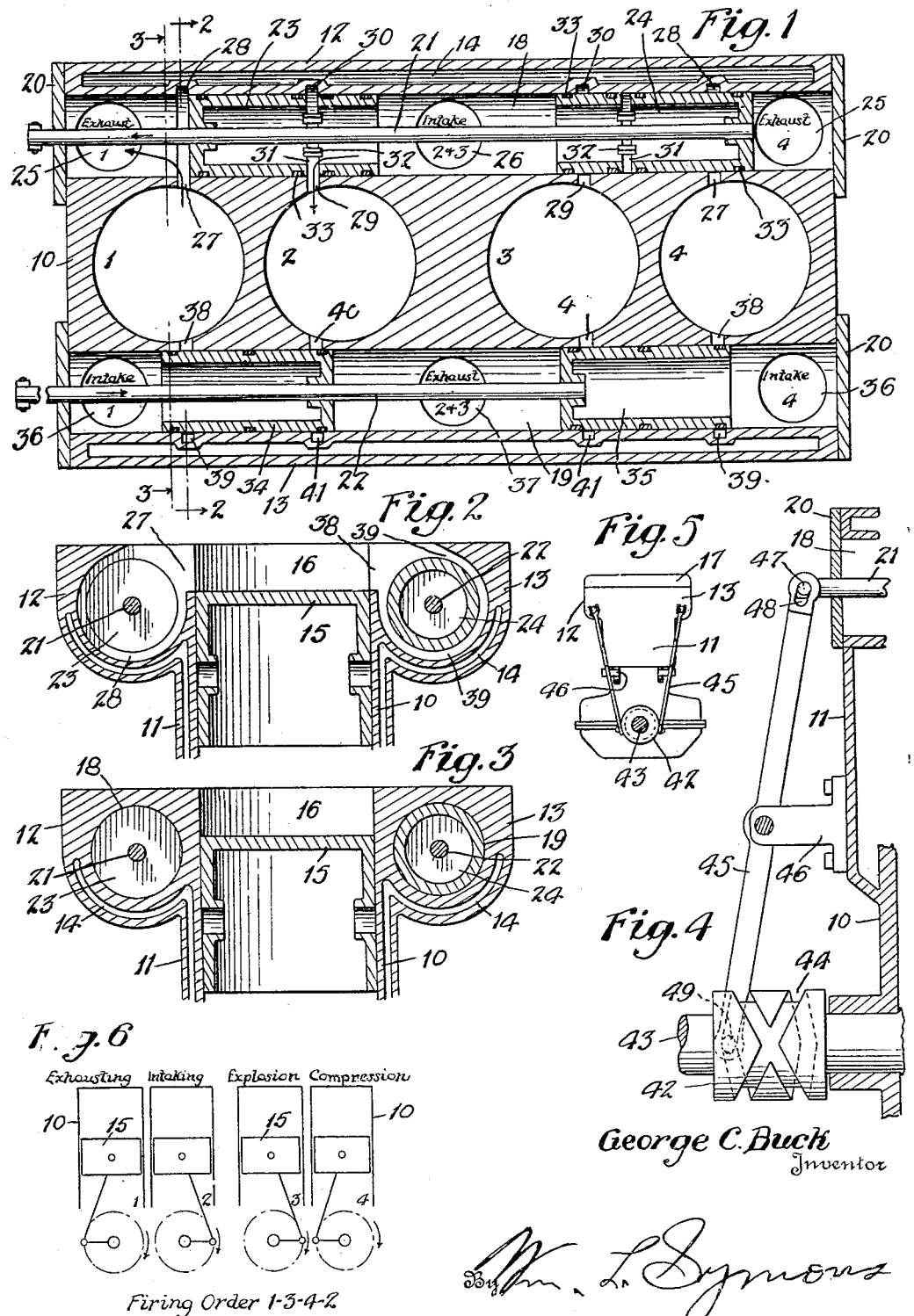

1,829,581

UNITED STATES PATENT OFFICE

GEORGE C. BUCK, OF HICKMAN, KENTUCKY

VALVE SYSTEM FOR INTERNAL COMBUSTION ENGINES

Application filed August 30, 1929. Serial No. 389,541.

My invention relates to internal combustion engines and more particularly to valves therefor.

An important object of my invention is the provision of a valve for an internal combustion engine which is smooth and noiseless in operation, and which is simple in construction and efficient in operation.

Other objects and advantages of my invention will be apparent during the course of the following description.

In the accompanying drawings which form a part of this specification and wherein like characters of reference denote like or corresponding parts throughout the same, Figure 1 is a horizontal sectional view through an internal combustion engine equipped with my novel valve system, Figure 2 is a vertical fragmentary section on the line 2—2 of Figure 1 with the head of the engine removed, Figure 3 is a similar view on the line 3—3 of Figure 1, Figure 4 is a fragmentary view of the valve operating mechanism, Figure 5 is a diagrammatic view of one end of the motor showing the location of the valve operating mechanism, and Figure 6 is a schematic representation of the cylinders and pistons of the engine when the valves are in the position shown in Figure 1 and when the firing order is one, three, four and two.

In the drawings, wherein for the purpose of illustration, is shown a preferred embodiment of my invention, the numeral 10 designates the engine block having cylinders 1, 2, 3 and 4 the upper ends of which are surrounded by the usual water jacket 11. On each side of the cylinder block, at the upper end thereof, longitudinally extending valve casings 12 and 13 are formed and have water jackets 14 connecting with the jackets 11. The pistons 15, when at the top of their stroke, do not extend to the top of the cylinder but leave a combustion chamber 16 at the top of the cylinder. Consequently, a flat head 17 may be used to cover the engine block and cylinders.

The valve casings 12 and 13 are provided with cylindrical bores 18 and 19, respectively, which extend throughout the entire length of the casings and are closed at their ends by suitable cover plates 20. Valve rods 21 and 22 are arranged centrally of the valve bores 18 and 19, respectively and extend through the plates 20 at one end of the engine. A pair of piston valves 23 and 24 are rigidly secured to the rod 21 the valve 23 being arranged adjacent cylinders 1 and 2 and the valve 24 being arranged adjacent cylinders 3 and 4. The valves 23 and 24 are arranged snugly within the bore or valve chamber 18 with their open ends facing one another.

Suitable exhausts openings 25 are arranged in each end of the valve casing 12 and an inlet opening 26 is arranged centrally of the valve casing 12 between the valves 23 and 24. Exhaust ports 27 connect the valve chamber 18 with the cylinders 1 and 4 and extend around the chamber 18 to form encircling grooves 28 therearound. Intake ports 29 connect the valve chamber 18 with the cylinders 2 and 3 and extend around the chamber 18 to form encircling grooves 30.

The valves 23 and 24 are provided with encircling ports 31 spaced from their heads a distance substantially equal to the distance between the grooves 28 and 30 said ports having ribs 32 to secure the separated portions of the valves together. Suitable packing rings or the like 33 are arranged on the valves 23 and 24 adjacent their ends and adjacent the ports 31. Reciprocal movement of the valve rod 21 causes corresponding movement of the valves 23 and 24 to cover and uncover the ports 27 and 29 to the cylinders.

A pair of piston valves 34 and 35 are rigidly secured to the valve rod 22 the valve 34 being arranged adjacent cylinders 1 and 2 and the valve 35 being arranged adjacent cylinders 3 and 4. The valves 34 and 35 are arranged snugly within the bore or valve chamber 19 with their closed ends facing one another.

Suitable intake openings 36 are arranged in each end of the valve casing 13 and an exhaust opening 37 is arranged centrally of the valve casing 13 between the valves 34 and 35. Intake ports 38 connect the valve chamber 19 with cylinders 1 and 4 and extend around the chamber 19 to form encircling grooves 39 therein. Exhaust ports 40 connect the valve chamber 19 with the cylinders 2 and 3 and extend around the chamber 19 to form encircling grooves 41. The valves 34 and 35 are imperforate and are reciprocated by the rod 22 to cover and uncover the ports 38 and 40.

The ports 27, 29, 38 and 40 connect with those portions of the cylinders forming the combustion chambers, as shown in Figure 2.

Any suitable means may be provided for reciprocating the valve rods 21 and 22. In Figures 4 and 5 I have illustrated one way of imparting this motion. A cam block 42 is secured to one end of the crank shaft 43 of the engine and is provided with a double loop cam groove 44. Levers 45 are pivoted adjacent their centers to brackets 46 on the engine block and are connected at their upper ends to the rods 21 and 22, this connection being obtained by pins 47 on the rods fitting in elongated slots 48 in the levers 45. The lower ends of the levers 45 are provided with suitable extensions or blocks 49 which fit into the cam groove 44 on diametrically opposite sides of the cam.

As the cam 42 rotates with the crank shaft 43, the levers are pivoted about their connection to the brackets 46 and impart reciprocating movement to the rods 21 and 22. The blocks 49 being 90° apart, on the cam block, the rods 21 and 22 will move at times in opposite directions and at other times in the same direction.

In operation when the piston in cylinder 3 is halfway down on the work stroke as illustrated in Figures 1 and 6, the piston in cylinder 1 is halfway up on the exhaust stroke, the exhaust port 27 is uncovered by the valve 23 and the exhaust gases are passing out through exhaust opening 25 as indicated by the arrow. The piston in cylinder 2 is halfway down on the intake stroke, the port 31 in valve 23 is in registration with intake port 29 and the gases are entering the cylinder as indicated by the arrow. Intake port 38 in cylinder 1 and exhaust port 40 in cylinder 2 are both closed by valve 34 and as cylinders 3 and 4 are on work and compression strokes respectively, all of their ports are closed by valves 24 and 35. The rod 22 is moving to the right in Figure 1 and when the pistons in cylinders 1 and 3 have reached the top and bottom of their strokes, respectively, valves 34 and 35 will uncover intake port 38 in cylinder 1 and exhaust port 40 in cylinder 3 while covering exhaust port 40 of cylinder 2 and intake 38 of cylinder 4. At the same time ports 27 and 29 will be closed by valves 23 and 24.

Ports 38 and 40 are never uncovered at the same time by the same valve but ports 27 and 29, by reason of the ports 31 in the valves 23 and 24 are uncovered at approximately the same time by the same valve. It is believed that the various positions of the valves and pistons on different strokes will be obvious from the description given. The valves are timed by means of the cam groove 44.

It will be seen that the valves uncover the ports in the cylinder when at or near the end of their movement, and, therefore, when they are moving at their slowest speed. This insures that the ports will be uncovered for a sufficient time to produce the most efficient operation of the engine. It will also be seen that the valves exhaust from their closed ends, and intake from their open ends, at all times.

Although Figures 2 and 3 are sections on Figure 1, the pistons are shown in their upper position for convenience of illustration. It will be obvious that instead of placing the valve chambers on the side of the engine block, they may be arranged in the engine head.

It is also to be understood that while I have illustrated and described my invention as applied to a four-cylinder motor, it may be applied to a motor having any number of cylinders.

While I have shown and described the preferred embodiment of my invention it is to be understood that various changes in the size, shape, and arrangement of parts may be resorted to without departing from the spirit of my invention or the scope of the subjoined claims.

What I claim and desire to protect by Letters Patent is:

1. In a multi-cylinder engine having cylinders arranged in pairs, a pair of valve casings extending longitudinally of the engine, said casings having intake and exhaust openings therein and intake and exhaust ports communicating with said cylinders, the intake and exhaust ports of each cylinder opening into a different valve casing and the exhaust port of one cylinder in each pair of cylinders opening into a different valve casing than the exhaust port of the other cylinder of the pair, valves slidably arranged in each of the valve casings, each casing having one piston valve for each pair of cylinders, the closed end of each valve facing the adjacent exhaust opening in its casing, and means to reciprocate the valves in the casings whereby each valve will cover and uncover the ports of the adjacent pair of cylinders.

2. In a multi-cylinder engine having cylinders arranged in pairs, a pair of valve casings extending longitudinally of the engine, said casings having intake and exhaust openings therein and intake and exhaust ports communicating with said cylinders, the intake and exhaust ports of each cylinder opening into a different valve casing and the exhaust port of one cylinder in each pair of cylinders opening into a different valve casing than the exhaust port of the other cylinder of the pair, piston valves slidably arranged in each of the valve casing, each casing having one valve for each pair of cylinders, the closed end of each valve facing the adjacent exhaust opening in its casing, and means to reciprocate the valves in the casings, the valves in one casing having ports adapted to register with the ports of one cylinder of each pair, whereby reciprocation of the valves having ports therein will uncover the ports of the cylinders in each pair substantially simultaneously and whereby the valves in the other casing will uncover the port of one cylinder substantially simultaneously with the port of a cylinder of another pair.

3. In a multi-cylinder engine, having cylinders arranged in pairs, a pair of valve casings extending longitudinally of the engine, said casings having intake and exhaust openings therein and intake and exhaust ports communicating with said cylinders, the intake and exhaust ports of each cylinder opening into a different valve casing and the exhaust port of one cylinder in each pair of cylinders opening into a different valve casing than the exhaust port of the other cylinder of the pair, valves slidably arranged in each valve casing between the intake and exhaust openings therein, there being a valve in each casing for each pair of cylinders, and means to reciprocate the valves in the casings in timed relation to the firing order of the engine, the valves in one casing having ports adapted to register with the ports of one cylinder of each pair near the end of the valve's movement, and the valves in the other casing being imperforate, whereby reciprocation of the valves having ports therein will uncover the ports of the cylinders in each pair substantially simultaneously and whereby the imperforate valves in the other casing will uncover the ports of adjoining cylinders of a pair alternately and substantially simultaneously with the ports of cylinders of another pair.

4. In a multi-cylinder engine having cylinders arranged in pairs, a pair of valve casings extending longitudinally of the engine, one of said valve casings having exhaust openings adjacent its ends and an intake opening adjacent its center, a pair of piston valves slidably arranged in said last named valve casing between the intake opening and the exhaust openings therein, said casing having intake ports communicating with the adjacent cylinders of each pair of cylinders and having exhaust ports communicating with the other cylinders of each pair, said valves being arranged with their open ends facing the intake opening in the center of the valve casing and having ports adapted to register with the intake ports of the cylinders, the other valve casing having intake openings adjacent its ends and an exhaust opening adjacent its center and having exhaust ports communicating with the adjacent cylinders of different pairs, said last named casing having intake ports communicating with the other cylinders of each pair, a pair of imperforate piston valves arranged in said last named valve casing between the exhaust opening and the intake openings therein, said last named valves having their closed ends facing the exhaust opening in the center of the casing, and means to reciprocate the valves in said casings in timed relation to the firing order of the engine.

In testimony whereof I affix my signature.

GEORGE C. BUCK.